United States Patent [19]

Lewis

[11] Patent Number: 5,031,054
[45] Date of Patent: Jul. 9, 1991

[54] IN-DRIVE DEFECT DETECTOR

[75] Inventor: William D. Lewis, Northboro, Mass.

[73] Assignee: Digital Equipment Corporation, Maynard, Mass.

[21] Appl. No.: 512,100

[22] Filed: Apr. 10, 1990

Related U.S. Application Data

[63] Continuation of Ser. No. 249,887, Sep. 26, 1988, abandoned.

[51] Int. Cl.$^5$ ............................................. G11B 27/36
[52] U.S. Cl. .................................................... 360/31
[58] Field of Search .......................................... 360/31

[56] References Cited

U.S. PATENT DOCUMENTS

| | | | |
|---|---|---|---|
| 4,214,280 | 7/1980 | Halfhill et al. | 360/53 |
| 4,754,222 | 6/1988 | Felleisen et al. | 360/31 |
| 4,821,254 | 4/1989 | Satoh et al. | 369/58 |

Primary Examiner—Vincent P. Canney
Attorney, Agent, or Firm—Neuman, Williams, Anderson & Olson

[57] ABSTRACT

Methodology and apparatus for in-drive defect testing of recording media, including recording a special defect detection signal in each recording media block from the end of its header to the end of the block, and detecting the recorded defect detection signal in each block from the end of its header to the end of the block.

22 Claims, 2 Drawing Sheets

IN-DRIVE DEFECT DETECTOR

This application is a continuation of application Ser. No. 07/249,887, filed Sept. 26, 1988, now abandoned.

BACKGROUND OF THE INVENTION

The present invention relates to recordable media defect detection for recording systems, and particularly to methods and apparatus for detecting recording media defects in a recorder-reproducer drive system.

Defect detection is generally performed for high quality recordable media, such as magnetic storage discs, as part of the manufacturing process with a dedicated single disc tester. Such disc testers perform drop-in/drop-out testing over the entire disc with special defect detection patterns before the disc is assembled into an associated disc pack. The defect pattern may be a so-called "4F" type, comprising a high level (1)-low level (0) alternating series (101010...) to best reveal "drop-outs," or missing 1's in the reproduced signal at the highest possible data rate. Alternately, a direct current erase signal may be recorded to sense "drop-ins," or extra 1's, in the reproduced signal. Since the discs are tested before assembly into an associated disc pack and formatted with all its embedded servo information (in a fully-embedded disc drive), it is unfeasible to accurately transfer the exact location of defects to the drive. Furthermore, variability in gap width and electrical parameters between the single disc tester and the disc drive reduce the quality of defect detection performed in the single disc tester.

In-drive defect detection is generally limited to recording and reproducing data patterns in the same way that recording and reproducing is performed under normal use, and errors in the read process are used to identify defects in each sector. This procedure cannot accurately detect defects in the data preamble and sync areas of each sector.

Consequently, it is much more desirable to arrange a defect detection system which performs drop-in/drop-out testing and utilizes the recording system of the recorder/reproducer drive system in which the discs are actually used.

SUMMARY OF THE INVENTION

The present invention overcomes the disadvantages of prior art recording media testing with methods and apparatus for testing magnetic storage discs in a recorder/reproducer disc drive system for use with such discs. The invention includes recording a continuous frequency pattern to detect drop-outs, or direct current erase to detect drop-ins, on the data portion of each sector of each track of a disc loaded into the disc drive, from the sector header through the entire data portion of the sector. The header and data portions of each sector are then evaluated using a threshold qualifier level for defects which is derived from the peak detected potential level of detected pulses. The threshold qualifier level is selectable to permit detection of defects that are not severe enough to interfere with readability of a new disc, but might cause problems after aging. Using the recording heads of the recorder/reproducer disc drive permits evaluation which identifies disc defects which actually affect drive performance, and which identify which particular sectors are adversely affected by defects. In this way, disc manufacture yield may be enhanced because many defective sectors may never be used with a particular disc application.

DETAILED DESCRIPTION OF THE PREFERRED EMBODIMENT

Figure 1:
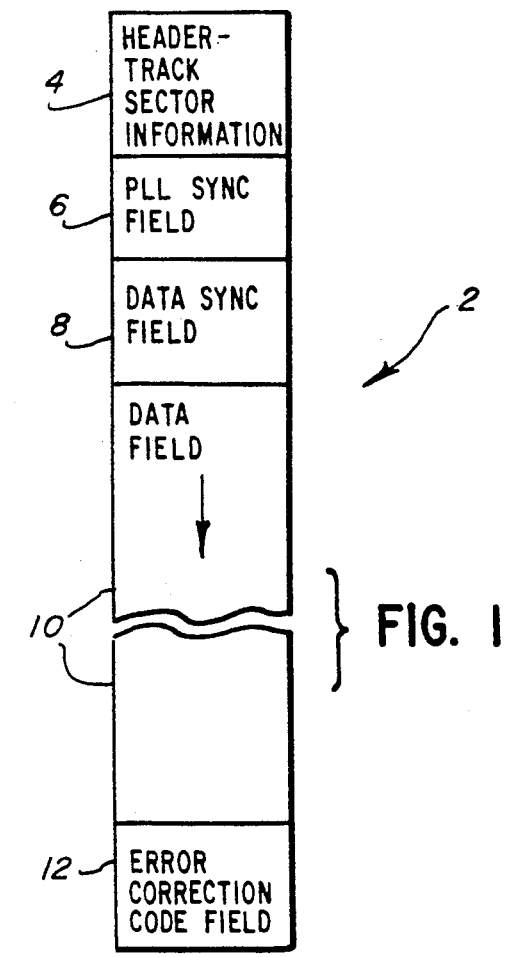
FIG. 1 is a map of a typical sector field with which the present invention can be used.

The present invention includes methodology and apparatus for achieving comprehensive in-drive defect testing of recording media, as well as precisely identifying and addressing areas of such recording media which are found to have unacceptable defects. Referring to the drawings, wherein reference characters designate like or corresponding parts throughout the views, FIG. 1 is a map of one typical sector field for a magnetic type recording disc medium. Such discs typically have a large number of concentric recording tracks adjacently arranged on the disc for maximum recording density. Different portions of each track are generally defined by a number of prescribed equal area disc sectors. Therefore, different portions of each track, commonly referred to as "blocks," may be individually identified by assigning each block with a track and sector address.

An addressed block area 2 of a track on a recordable disc media is represented as a rectilinear region in FIG. 1. The block is addressed in a header region 4 at the beginning of the block 2 which typically includes track, sector and analog track centering information. A recording disc is first tested on a single disc tester, then installed into an associated disc pack, and then recorded with a dedicated servo writer which defines data blocks in each sector of each track, such as the block 2, with data in the header 4 only. This dedicated servo writer has sufficient resolution to accurately identify and address each of the tracks and sectors on the disc, as well as a recording head which has the most suitable configuration and gap for recording the address and analog tracking information.

After the header 4 has been written on every sector of every track by the servo writer, the disc pack is installed in the recorder/reproducer disc drive. When the disc drive records in the block 2, it begins recording phase locked loop (PLL) synchronization information in a PLL sync field 6 following the header 4. This information is necessary to synchronize the disc drive when reproducing the recorded information. Thus, the signal recorded in the PLL sync field 6 synchronizes the disc drive and reproduction circuitry whenever the recorded disc is read.

After the PLL sync field 6 is recorded, data synchronization information is recorded in a data sync field 8 following the PLL sync field 6. The data sync field 8 defines the byte boundaries for data stored in a data field 10 following the data sync field 8. Defining the byte boundaries in the data sync field 8 allows the disc drive to accurately convert data bits which are serially recorded in the data field 10 to data words comprising a parallel combination of data bits, with each data word including a prescribed number of bits, typically sixteen. Following the data field 10, error correction code (ECC) data is generally included in an ECC field 12. The ECC data defines the data recorded in the data field 10 block 2 to allow the disc drive to rely on redundantly recorded data to compensate for some errors in the recording and reproducing process.

In-drive test systems according to the prior art incorporate a test procedure which records and reproduces data patterns, using the detection of errors in the reproduction process to locate defects. This recording/reproduction process is the same process that is used in the drive under normal operation, so that the PLL sync, data sync, data and ECC fields are all recorded as described above. This process must typically be repeated several times to locate most of the defects in the data field 10 and ECC field 12, and cannot accurately locate defects in the PLL sync field 6 or data sync field 8, as will be discussed below.

It is common practice to also record the defective blocks found with this process in a special replacement and cacheing table (RCT) for reference. This bad block table can then be read by any disc drive using the disc to prevent recording on any blocks which have been found bad with the above described tests.

However, such in-drive tests performed according to the prior art are not completely satisfactory. First of all, disc drives are designed with a qualifier threshold which permits the drive to reproduce data recovered from discs over a considerable range of output level shift and with significant noise levels to provide a maximum degree of reliability even with aged disc packs. However, the tolerance of the disc drive to level shift and noise prevents the disc drive from being able to sense marginal drop-ins and drop-outs in the data field 10 and ECC field 12. Thus, blocks that are marginal when new may initially be found acceptable, but after several record/erase cycles may become unusable.

Furthermore, drop-outs in the PLL sync field 6 and the data sync field 8 may not be detected upon testing. The sync signals in these fields may be recorded over a defect in such a way that the defect does not interfere with PLL sync or data sync when the tested block 2 is reproduced. For instance, a drop-in will not interfere with a high signal level, or "1" state, and a drop out will not interfere with a low signal level, or "0" state. However, after testing is complete, the block 2 when prerecorded may have such undetected defects shifted in position relative to the PLL sync and data sync signals to completely interfere with recovering data recorded on the block 2.

For example, if a defect in the PLL sync field 6 interferes with the PLL sync function, the disc drive will not be able to synchronize with the data on the disc, and recovery of data from the block 2 will not be possible. Likewise, if a previously undetected defect in the data sync field 8 shifts in position to prevent the drive from determining byte boundaries of the data field 10 and ECC field 12, the disc drive cannot recover the recorded data.

The prior art in-drive testing procedures simply detect errors in the defect pattern with standard disc drive reproducing circuitry. Thus, any defects even just below the normal qualifier threshold level used to distinguish a 1 from a 0 will not register as a defect. Unfortunately, after some amount of disc use, these defects may exceed this threshold and later allow the disc drive to record data in a bad block.

The present invention overcomes the above described deficiencies with an improved in-drive testing procedure and system incorporated into the disc drive with which the disc is used. A typical disc drive system including the present invention is represented in block form in FIG. 2. The normal recording sequence starts with a microprocessor 14, which accepts data for storage and selects suitable data block addresses on the disc for the data to be recorded. The microprocessor 14 interconnects via an input-output control and data bus 16 to an integrated controller 18, an in-drive defect detector 20 and a digital to analog (D/A) converter 22. The integrated controller 18 receives control and data signals from the microprocessor 14 and processes them to provide real time control data for operation of the disc drive on at least one real-time control output line 24. The integrated controller 18 also converts data transmitted to it from the microprocessor 14 to real time write data on a write data output line 26.

The write data is normally transmitted on the write data output line 26 into the IDDD 20, which allows it to continue on a write data preamp input line 28 to a disc drive transducer head preamp 30. The transducer head preamp 30 converts the write data into a recording signal which is fed on a transducer input-output line 32 into a disc drive transducer head 34. The integrated controller 18, under command from the microprocessor 14, controls a disc drive servo system (not shown) to properly position the transducer head 34 relative to the addressed disc data block.

The present invention operates in the recording mode under command of the microprocessor 14. The microprocessor 14 sends defect test record command signals to the IDDD 20 and normal command signals to the integrated controller 18 via the control and data bus 16. The integrated controller 18 processes its commands from the microprocessor 14 to provide a real time record command signal, which is sent to the IDDD 20 via the real time control line 24. The IDDD 20 uses the command signals from the microprocessor 14 and integrated controller 18 to interrupt the normal flow of write data from the integrated controller 18 via the write data output line 26 to the transducer head preamp 30 via the preamp input line 28. It substitutes a defect test write signal on the preamp input line 28 which has its pattern determined by command from the microprocessor 14 and its initialization determined by control signals from the integrated controller 18, as explained in detail below in connection with the description of the IDDD 20 itself.

In accordance with the present invention, the recording mode of the defect test is initiated by the microprocessor 14, which commands the integrated controller 18 to signal the IDDD 20 to begin the defect test write signal after the end of the header for each data block addressed by the microprocessor 14 for testing is sensed by the integrated controller 18. The IDDD 20 continues the defect test write signal for an interval, defined by the integrated controller 18 as in a normal write cycle, which corresponds to that required to record the defect test write data signal onto the addressed data block through the very end of its ECC field, with the transducer head 34 driven by the associated recording signal supplied by the preamp 30, as explained above. After completion of the timed test period, the IDDD 20 allows the normal write data path to resume from the integrated controller 18 to the preamp 30, unless the defect test commands continue, typically in a block by block, track by track recording sequence.

The normal reproducing sequence is initiated by the microprocessor 14, which sends control signals to the integrated controller 18, the IDDD 20 and the D/A converter 22 to put the disc drive system in the reproduction mode. The integrated controller 18 processes the command signals from the microprocessor 14 to provide real time control signals on the real time control line 24. The IDDD 20 processes the command signals from the microprocessor 14 and the integrated controller 18 to produce a qualifier threshold select signal on a threshold select output line 36, which is used to change the qualifier threshold level for the disc drive system, as further explained below. The D/A converter 22 provides a qualifier threshold adjustment signal on a threshold adjustment output line 38 in response to command signals from the microprocessor 14 to fine tune the selected qualifier threshold level, as further explained below. The microprocessor 14 also commands the integrated controller 18 to position the transducer head 34 over the selected data block on the disc with the disc drive servo system.

The transducer head 34 transmits a reproducing signal on the transducer line 32 into the preamp 30. The preamp 30 converts the reproducing signal to a raw read signal on a preamplifier output line 40. The raw read signal is an amplified flux transition signal which must be further processed for use by the disc drive system. The raw read signal is fed into an analog read channel (ARC) 42, which processes the raw read signal on the preamp output line 40 to provide three different outputs. One output is an undifferentiated output signal on an undifferentiated output line 44 which has an unclocked pulsed output corresponding to the flux transitions of the raw read signal on the preamp output line 40. Another output is a differentiated output signal on a differentiated output line 46 which corresponds to the derivative of the undifferentiated output signal on the undifferentiated output line 44. Thus the differentiated output signal has positive and negative output zero crossings corresponding to the positive and negative peaks of the pulses in the undifferentiated output signal. The third signal is a qualifier threshold signal on a qualifier threshold output line 48, which corresponds to the peak level of the raw read signal on the preamp output line 40.

A qualifier 50 accepts and processes the undifferentiated, the differentiated and the qualifier threshold output signals on the lines 44, 46 and 48 respectively, and produces a serial stream of unclocked data pulses on a qualifier output line 52. The qualifier 50 selects a certain proportion of the qualifier threshold signal on the qualifier threshold output line 48 to serve as a minimum reference level to distinguish a high level "1" state from a low level "0" state. For instance, a qualifier threshold of 45 percent means that raw read signal levels on the line 40 which are between 45 and 100 percent of the peak raw read signal level will be processed by the qualifier 50 as a 1 state, while levels up to 45 percent will be processed as a 0 state. This qualifier threshold enhances readability of discs, because it provides discrimination against partial drop-outs for 1 states and helps to suppress extraneous noise interference for 0 states.

Unlike prior art qualifier processing, and unique to the present invention, the qualifier 50 has a threshold level which is both selectable for different proportions of the qualifier threshold signal outputted by the ARC 42, and adjustable about the selected qualifier threshold proportions for fine tuning and component calibration. The qualifier 50 accepts and processes the threshold select signal on the line 36 from the IDDD 20 and the threshold adjustment signal on the line 38 from the D/A converter to determine the exact proportion of the qualifier threshold signal to serve as the qualifier threshold. Thus, the IDDD 20 can control the qualifier 50 to change the qualifier threshold from 45 to 70 percent, for instance. In this way, the disc drive reproduction system may be made more sensitive to drop-outs in the recorded data so that defects are more easily ascertained. If a 70 percent qualifier threshold is selected for testing purposes, only a 30 percent reduction in the raw read signal on line 42 caused by a marginal defect is necessary to cause a change from the 1 state to the 0 state, thereby causing a data drop-out.

The serial data stream signal on the qualifier output line 52 is fed to a data separator (DS) 54 which separates the PLL sync and data sync portions from the remainder of the serial data stream on the line 52 to provide a read data output signal on a read data output line 56. The DS 54 also provides a reference clock synchronization signal on a clock synchronization line 58 to provide a phase reference for properly reading the read data output signal on the line 56. The read data output and clock signals on the lines 56 and 58 respectively normally pass through the IDDD 20 to the integrated controller 18 via a read data input line 60 and a clock input line 62. The integrated controller 18 uses the clock sync signal to convert the PLL sync, data sync, data and ECC portions of the read data signal to provide disc drive system output, which may be transferred to the microprocessor 14 via the control and data bus 16.

In accordance with the present invention, the reproduction mode of the defect test for drop-out detection is initiated by the microprocessor 14, which commands the integrated controller 18 to engage its reproduction mode, commands the IDDD 20 to change its threshold select output signal on the line 36 from a normal low percentage, such as 45 percent, to a high one, such as 70 percent, to sensitize the disc drive reproduction system to defects. The microprocessor 14 also commands the D/A converter 22 to adjust the selected qualifier threshold percentage for fine tuning the qualifier threshold about the selected percentage, to 69 or 71 percent from 70 percent, for instance.

For drop-in detection with a drop-in defect detection pattern such as a direct current erase signal, the peak value of the qualifier threshold level will be zero. It is desirable to lower the normal qualifier threshold in this case to detect marginal drop-ins which do not reach the normal qualifier threshold level used for data recovery purposes. The qualifier threshold select signal on the line 36 has no effect during the reproduction mode of the drop-in test, since selecting some percentage of a zero peak qualifier threshold is still zero. Instead, the threshold adjustment signal on line 38 is used to provide a fixed level for a qualifier threshold level. The threshold qualifier level may thereby be set for an effective qualifier threshold of perhaps 20 percent of what the peak level of the qualifier threshold signal on the line 48 would be if a normal data signal was reproduced.

The microprocessor 14 also commands the IDDD 20 to engage the defect detection mode, including a command signal for drop-in or drop-out testing. After the integrated controller 18 senses the end of the header for the data block addressed by the microprocessor 14 for testing, the read data and clock sync signals on the lines 56 and 58 respectively are processed by the IDDD 20. The IDDD 20 counts drop-outs, or drop-ins, as selected by the IDDD 20, and stores the counted defects for transmission to the microprocessor 14 after completion of the defect test. The IDDD 20 times the tested data block period to continue testing from the end of the data block header to the end of the data block ECC field.

Figure 3:
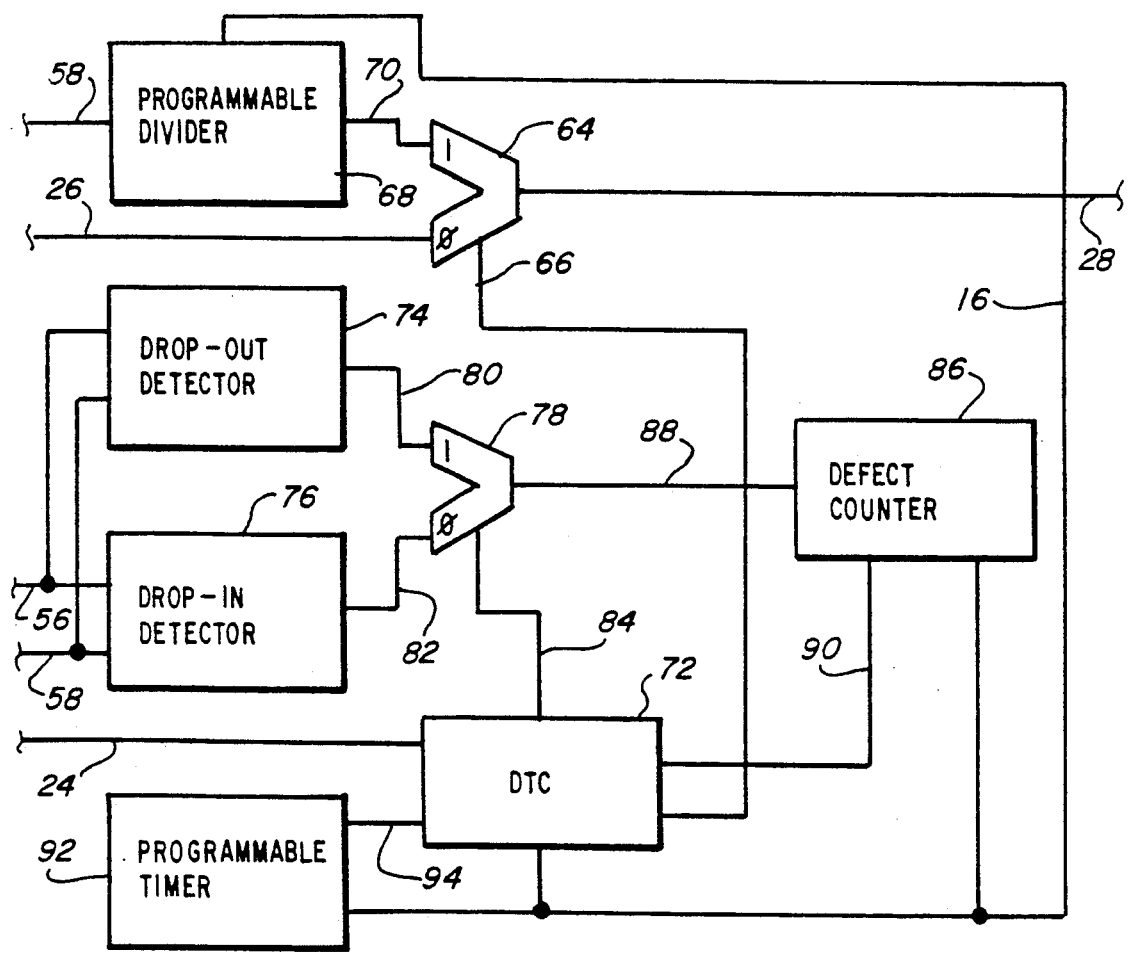
FIG. 3 is a preferred embodiment of an indrive defect detector according to the present invention.

The IDDD 20 may be implemented with a variety of configurations, but a system diagram of a preferred embodiment is shown in FIG. 3. As explained above, when the microprocessor 14 initiates the recording mode of the defect test, the normal write data path between the lines 26 and 28 through the IDDD 20 is interrupted. This is accomplished with a two input record mode multiplexer gate 64 which has its inputs selectively controlled by a write defect pattern control signal provided on a write signal control output line 66. The normal write data from the integrated controller 18 is fed to one input of the record mode gate 64 via the line 26. The other input of the record mode gate 64 is fed by the output of a programmable divider 68 via a divider output line 70. The programmable divider 68 has a denominator input fed by the control and data bus 16.

The numerator input of the programmable divider 68 is fed by a clock, conveniently the clock sync signal from the DS 54 on the line 58. The microprocessor 14 provides a signal representing a numerical value to the denominator input of the programmable divider 68 which produces a constant output frequency on the divider output line 70 which frequency is proportional to the ratio of the frequency of the clock signal 58 to the numerical value of the denominator signal supplied by the microprocessor 14. In this way, a defect test pattern signal, such as the 4F or direct current erase signal described above, may be substituted on the write data preamp input line 28 when the recording mode of the defect test is commenced. One particular value, such as zero, can be used to disable the programmable divider 68 and put a constant level (no transitions) on the write data preamp input line 28, which will perform the direct current erase function. In this way, a defect test pattern signal, such as the 4F or direct current erase signal described above, may be substituted on the write data preamp input line 28 when the recording mode of the defect test is commenced.

The write defect control signal on the line 66 is supplied by a defect test controller (DTC) 72. The DTC 72 produces the write defect pattern control signal in response to signals from the integrated controller 18 and the microprocessor 14 as described below in connection with the detailed description of the DTC 72.

The reproduction mode of the defect test, as explained above, includes detecting defects in the read data on the line 56 with the IDDD 20 instead of passing the read data through the IDDD 20 to the integrated controller 18 via the read data input line 60. The read data and clock sync signals on the lines 56 and 58 may be simultaneously fed into corresponding inputs of a drop-out detector 74 and a drop-in detector 76. If a 4F defect signal pattern is employed, the drop-out detector 74 may be no more than a simple flip-flop and an OR gate to detect the presence of two consecutive 0 states in the read data. Such presence indicates the detection of a drop-out, which is transmitted from the output of the defect detector 74 to one input of a selectable two input reproduction mode multiplexer gate 78 via a drop-out detector line 80.

The drop-in detector 76 may be no more than a buffer or an inverter if a direct current erase signal is used for drop-in testing, since the presence of a 1 in the read data signal indicates a drop-in. The output of the drop-in detector 76 is fed to the other input of the reproduction mode gate 78 via a drop-in detector output line 82. Drop-in and drop-out detector selection is secured by switching the reproduction mode gate 78 with a drop-in/drop-out select signal supplied by the DTC 72. The DTC 72 provides this signal on a test select line 84 in response to a command signal from the microprocessor 14 as explained in connection with the detailed description of the DTC 72 below.

The output of the reproduction mode gate 78 is fed to a counter 86 via a defect input line 88 so that the number of drop-ins or drop-outs detected during the test may be counted. The counter is enabled with a count enable signal supplied by the DTC 72 via a count enable line 90. The counter transmits its count to the microprocessor 14 at the end of each tested data block via the control and data bus 16. The DTC 72 is timed by a programmable sector timer 92, which has a period corresponding to the period of the data blocks from the end of the header to the end of the ECC field. The output of the timer 92 is fed to the DTC 72 via a timer input line 94. The timer 92 is loaded with the proper timer value by a signal supplied by the microprocessor 14 via the control and data bus 16.

The counter 86 transfers its output to the microprocessor 14 via the control and data bus 16 after each data block is tested. The microprocessor 14 correlates each defect count with the address of each associated data block and stores this data in memory. After the defect detection procedure has been completed, the microprocessor 14 may command the disc drive to record the addresses of tested data blocks with detected defects in special dedicated tracks on the disc to establish a factory control table (FCT) for the disc.

Figure 4:
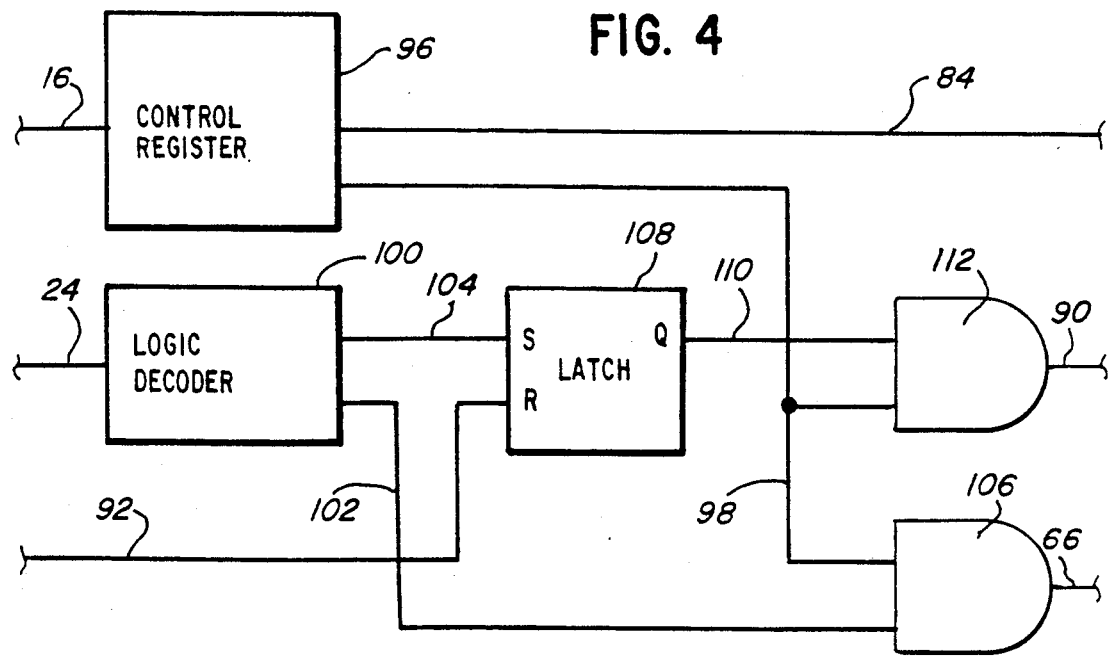
FIG. 4 is a preferred embodiment of a defect test controller according to the present invention.

Although the DTC 72 may have a variety of configurations, a system diagram of a preferred embodiment is shown in FIG. 4. During the record mode of the defect test, a control register 96 provides the drop-in/drop-out select signal on the line 84 and an enable defect test signal on an enable test output line 98 in response to a signal from the microprocessor 14 via the control and data bus 16. A logic decoder 100 has two outputs, a write enable output on a write enable output line 102 and a read enable output on a read enable output line 104, which are controlled by at least one real time control signal from the integrated controller 18 via the line 24. A write pattern gate 106, comprising a simple two input AND gate, has one input fed by the enable defect test output signal on the line 98 and its other input fed by the write enable output signal on the line 102. The write pattern gate 106 feeds the record gate 64 via the line 66 to control the defect pattern transmission. When both the signals on the lines 98 and 102 are 1, the record mode gate 64 is switched to transmit the output of the programmable divider 68 to provide pattern writing.

In the reproduction mode, the logic decoder 100 provides a 1 output on the read enable line 104 to set a simple latch 108, such as an S/R flip-flop. The output of the latch 108 on a latch output line 110 feeds one input of an enable defect count gate 112, which may be a simple two input AND gate. The other input of the enable defect count gate 112 is fed by the line 98, so that when both the lines 98 and 110 are 1, the enable defect count gate 112 transmits an enable input signal on the line 90 to enable the defect counter 86. At the end of the timed data block period, the programmable timer 92 resets the latch 108 to disable the enable defect count gate 108 and stop the defect count.

Figure 2:
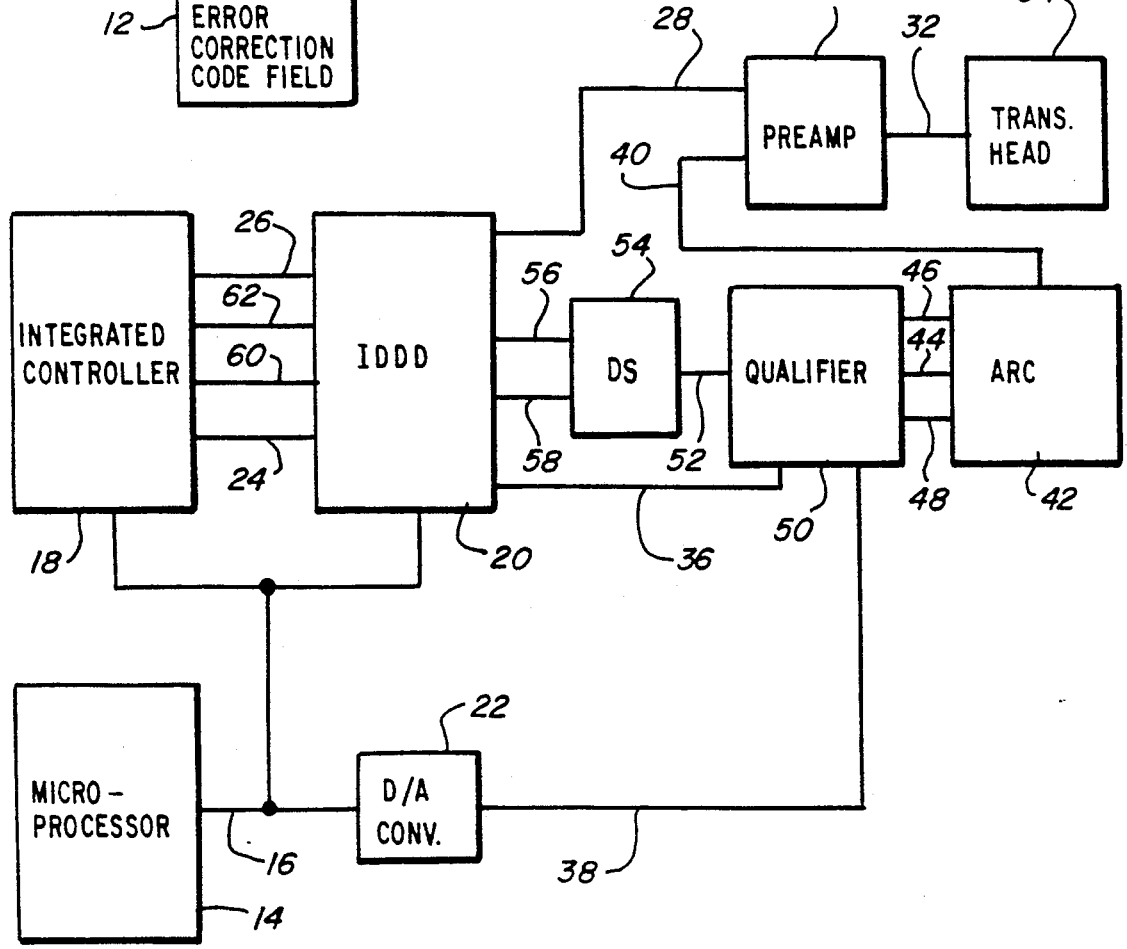
FIG. 2 is a system block diagram of a typical disc drive system incorporating the present invention.

The present invention as described above may conveniently include "zone" testing of each tested data block when it is desirable to allow for more defects in the data field than in the PLL sync and data sync fields, since the data field is generally protected by an ECC. Referring to FIGS. 2 and 3, the programmable timer 92 in the IDDD 20, which defines the end of the defect test described above, is first programmed by the microprocessor 14 via the control data bus 16 to stop the defect test just after the PLL sync and data sync fields. The defect count in these fields, which fields may be designated a first test zone, can then be checked to some tight criteria. The programmer timer 92 can then be reprogrammed by the microprocessor 14 to terminate the test at the end of the entire tested data block. The defect count for the remainder of the data block, which may be designated a second zone, can then be checked to some looser criteria, since data in this zone is protected by an ECC.

It will be understood that various changes in the details, arrangements and configurations of the parts and systems which have been herein described and illustrated in order to explain the nature of the invention may be made by those skilled in the art within the principle and scope of the invention as expressed in the appended claims.

What is claimed is:

1. Apparatus for detecting defects on a recordable medium in an associated transducer system, said medium including a plurality of discrete data blocks with distinctly addressed data block headers, comprising:
   means for selecting a plurality of data block addresses to define a plurality of addressed data blocks on said recording medium to be tested;
   means for accessing each one of said addressed data blocks with said transducer system;
   means for recording a defect test signal with a programmable divider on each said accessed data block after the header of said accessed data block and continuing to the end of said accessed data block to establish a plurality of test recorded data blocks;
   means for accessing each one of said test recorded blocks with said transducer system;
   means for reproducing said recorded defect test signal on each said accessed test recorded block after the header of said accessed test recorded block and continuing to the end of said accessed test recorded block;
   means for detecting errors in said recorded defect test signal reproduced from each said accessed test recorded block, said detected errors corresponding to defects on said recordable medium; and
   means for counting said defects detected in each said accessed test recorded block.

2. The apparatus recited in claim 1, wherein said programmable divider generates a high level, low level, alternating "4 F" (101010...) defect detection bit signal pattern as said defect test signal for detecting drop-out defects.

3. The apparatus recited in claim 2, wherein said means for detecting includes means for sensing two consecutive low level (0) bits in said recorded defect test signal reproduced from each said accessed test recorded block to sense drop-out defects.

4. The apparatus recited in claim 1, wherein said programmable divider generates a continuous low level, "direct current erase" (000...) defect detection bit signal pattern as said defect test signal for detecting drop-in defects.

5. The apparatus recited in claim 4, wherein said means for detecting includes means for sensing high level (1) bits in said recorded defect test signal reproduced from each said accessed test recorded block to sense drop-in defects.

6. The apparatus recited in claim 1, further comprising:
   means for automatically changing a qualifier threshold between high levels and low levels for said recorded defect test signal reproduced from each accessed test recorded block from a normal reproduction level to test level and wherein said means for detecting uses said test level qualifier threshold.

7. The apparatus recited in claim 6, wherein said means for threshold changing comprises:
   means for selecting said qualifier threshold higher than said normal qualifier threshold for drop-out defect testing purposes; and
   means for adjusting said selected qualifier threshold test level higher than said normal level.

8. The apparatus recited in claim 6, wherein said means for threshold changing includes means for adjusting said qualifier test level lower than said normal level for drop-in defect testing.

9. The apparatus recited in claim 1, wherein said means for reproducing comprises a programmable timer.

10. The apparatus recited in claim 9, wherein said programmable timer times the period of reproducing said recorded defect test signal on each said accessed test recorded block and terminates the reproduction from said accessed test recorded block after said timed period exceeds a prescribed period for said transducer system to reproduce from said accessed test recorded block after the header on said accessed test recorded block and continuing to the end of said accessed test recorded block.

11. The apparatus recited in claim 9, further comprising:
   means for automatically changing a qualifier threshold between high levels and low levels for said recorded defect test signal reproduced from each accessed test recorded block from a normal reproduction level to a test level and wherein said means for detecting uses said test level qualifier threshold.

12. The apparatus recited in claim 11, wherein said means for threshold changing comprises:
   means for selecting said qualifier threshold higher than said normal qualifier threshold for drop-out defect testing purposes; and
   means for adjusting said selected qualifier threshold test level higher than said normal level.

13. The apparatus recited in claim 11, wherein said means for threshold changing includes means for adjusting said qualifier test level lower than said normal level for drop-in defect testing.

14. The apparatus recited in claim 11, further comprising means for storing said counted defects from each said accessed test recorded block.

15. Apparatus for detecting defects on a recordable medium in an associated transducer system, said medium including a plurality of discrete data blocks with distinctly addressed data block headers, comprising;

means for selecting a plurality of data block addresses to define a plurality of addressed data blocks on said recording medium to be tested;

means for accessing each one of said addressed data blocks with said transducer system;

means for recording a defect test signal on each said accessed data block after the header of said accessed data block and continuing to the end of said accessed data block to establish a plurality of test recorded data blocks;

means for accessing each one of said test recorded blocks with said transducer system;

means for reproducing said recorded defect test signal on each said accessed test recorded block after the header of said accessed test recorded block and continuing to the end of said accessed test recorded block with a programmable timer;

means for detecting errors in said recorded defect test signal reproduced from each said accessed test recorded block, said detected errors corresponding to defects on said recordable medium; and means for counting said defects detected in each said accessed test recorded block.

16. The apparatus recited in claim 15, wherein said programmable timer times the period of reproducing said recorded defect test signal on each said accessed test recorded block and terminates the reproduction from said accessed test recorded block after said timed period exceeds a prescribed period for said transducer system to reproduce from said accessed test recorded block after the header on said accessed test recorded block and continuing to the end of said accessed test recorded block.

17. The apparatus recited in claim 15, further comprising:

means for automatically changing a qualifier threshold between high levels and low levels for said recorded defect test signal reproduced from each accessed test recorded block from a normal reproduction level to a test level and wherein said means for detecting uses said test level qualifier threshold.

18. The apparatus recited in claim 17, wherein said means for threshold changing comprises:

means for selecting said qualifier threshold higher than said normal qualifier threshold for drop-out defect testing purposes; and means for adjusting said selected qualifier threshold test level higher than said normal level.

19. The apparatus recited in claim 17, wherein said means for threshold changing includes means for adjusting said qualifier test level lower than said normal level for drop-in defect testing.

20. Apparatus for detecting defects on a recordable medium in an associated transducer system, said medium including a plurality of discrete data blocks with distinctly addressed data block headers, comprising:

means for selecting a plurality of data block addresses to define a plurality of addressed data blocks on said recording medium to be tested;

means for accessing each one of said addressed data blocks with said transducer system;

means for recording a defect test signal with a programmable divider on each said accessed data block after the header of said accessed data block and continuing to the end of said accessed data block to establish a plurality of test recorded data blocks;

means for accessing each one of said test recorded blocks with said transducer system;

means for reproducing said recorded defect test signal on each said accessed test recorded block after the header of said accessed test recorded block and continuing to the end of said accessed test recorded block with a programmable timer;

means for detecting errors in said recorded defect test signal reproduced from each said accessed test recorded block, said detected errors corresponding to defects on said recordable medium; and means for counting said defects detected in each said accessed test recorded block.

21. Apparatus for detecting defects on a recordable medium in an associated transducer system, said medium including a plurality of discrete data blocks with distinctly addressed data block headers, comprising:

means for selecting a plurality of data block addresses to define a plurality of addressed data blocks on said recording medium to be tested;

means for accessing each one of said addressed data blocks with said transducer system;

means for recording a defect test signal with a programmable divider on each said accessed data block after the header of said accessed data block and continuing to the end of said accessed data block to establish a plurality of test recorded data blocks;

means for accessing each one of said test recorded blocks with said transducer system;

means for reproducing said recorded defect test signal on each said accessed test recorded block after the header of said accessed test recorded block and continuing to the end of said accessed test recorded block with a programmable timer;

means for automatically changing a qualifier threshold between high levels and low levels for said recorded defect test signal reproduced from each said accessed test recorded block from a normal reproduction level to a test level;

means for detecting errors in said recorded defect test signal reproduced from each said accessed test recorded block with said test level qualifier threshold, said detected errors corresponding to defects on said recordable medium; and means for counting said defects detected in each said accessed test recorded block.

22. Apparatus for detecting defects on a recordable disc in an associated recorder/reproducer disc drive, said recordable disc including a plurality of discrete data blocks with distinctly addressed data block headers, comprising:

a microprocessor for selecting a plurality of data block addresses to define a plurality of addressed data blocks on said recordable disc to be tested and for accessing said addressed data block to record and reproduce;

an in-drive defect detector, including:

a programmable divider for generating a defect test signal for recording on each said accessed data block with said disc drive to establish a plurality of test recorded data blocks; a programmable timer for timing the period of said recorded defect test signal reproduced from each of said accessed test recorded data blocks from after the header of said accessed test recorded data block and continuing to the end of said accessed test recorded data block; a qualifier control for selecting the qualifier threshold and for detecting marginal errors in said recorded defect test signal reproduced from each said accessed test recorded data block, said detected errors corresponding to defects on said recordable disc; and a programmable counter for counting said defects detected in each said accessed test recorded block.

* * * * *